(12) United States Patent
Knaus

(10) Patent No.: US 7,185,632 B2
(45) Date of Patent: Mar. 6, 2007

(54) INTERNAL COMBUSTION ENGINE AND METHOD OF OPERATING THE SAME

(75) Inventor: Konrad Knaus, Gaildorf (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 11/177,558

(22) Filed: Jul. 11, 2005

(65) Prior Publication Data

US 2006/0021591 A1 Feb. 2, 2006

(30) Foreign Application Priority Data

Jul. 28, 2004 (DE) ............. 10 2004 036 557

(51) Int. Cl.
*F02P 5/06* (2006.01)
*F02P 5/00* (2006.01)

(52) U.S. Cl. ............... 123/406.25; 123/406.41
(58) Field of Classification Search ........... 123/406.22, 123/406.23, 406.24, 406.25, 406.41, 406.46, 123/155, 406.5, 406.51, 406.52, 406.56; 73/35.12
See application file for complete search history.

(56) References Cited

U.S. PATENT DOCUMENTS

| | | | | |
|---|---|---|---|---|
| 1,840,367 A | * | 1/1932 | Pasteris .................. | 123/155 |
| 3,060,912 A | * | 10/1962 | May ......................... | 123/429 |
| 3,707,953 A | * | 1/1973 | Rhoades et al. ......... | 123/406.11 |
| 4,204,511 A | * | 5/1980 | Morris .................... | 123/179.11 |
| 4,236,214 A | * | 11/1980 | Sasayama ................ | 701/110 |
| 4,392,082 A | * | 7/1983 | Harada .................... | 315/55 |
| 4,543,634 A | * | 9/1985 | Kobayashi et al. ....... | 701/110 |
| 5,507,263 A | * | 4/1996 | Yamazaki et al. ....... | 123/65 PE |
| 5,937,813 A | * | 8/1999 | Shifflette ................. | 123/169 V |
| 5,955,826 A | * | 9/1999 | Suzuki et al. ............ | 313/119 |
| 6,138,654 A | * | 10/2000 | Pretorius et al. ......... | 123/642 |
| 6,427,647 B1 | * | 8/2002 | Galka et al. ............. | 123/73 B |
| 6,668,632 B2 | * | 12/2003 | Ford et al. ............... | 73/118.1 |
| 6,745,119 B2 | * | 6/2004 | Ohno et al. .............. | 701/110 |
| 6,948,478 B2 | * | 9/2005 | Fuwa et al. .............. | 123/435 |

FOREIGN PATENT DOCUMENTS

DE 75 19 322 12/1975

* cited by examiner

*Primary Examiner*—Mahmoud Gimie
(74) *Attorney, Agent, or Firm*—Walter Ottesen

(57) ABSTRACT

An internal combustion engine (20) has a cylinder (1) wherein a piston (2) is mounted. The piston (2) drives a crankshaft (10) which is rotatably journalled in a crankcase (11). The piston (2) delimits a combustion chamber wherein an air/fuel mixture is compressed and is ignited by an ignition device (19). The ignition time point (Z) is determined in a first operating state of the engine (20) in accordance with a first characteristic line (22) and in a second operating state of the engine (20) in accordance with a second characteristic line (23). A switching element switches over between the first characteristic line (22) and the second characteristic line (23) in dependence upon an engine characteristic variable. A method for operating the engine (20) provides that an engine characteristic variable is determined during operation of the engine (20) and that a switchover between the ignition characteristic lines (22) and (23) takes place for a pregiven change of the characteristic variable.

27 Claims, 4 Drawing Sheets

INTERNAL COMBUSTION ENGINE AND METHOD OF OPERATING THE SAME

CROSS REFERENCE TO RELATED APPLICATION

This application claims priority of German patent application no. 10 2004 036 557.1, filed Jul. 28, 2004, the entire content of which is incorporated herein by reference.

FIELD OF THE INVENTION

The invention relates to an internal combustion engine, especially in a portable handheld work apparatus such as a motor-driven chain saw, cutoff machine or the like. The invention also relates to a method of operating the engine.

BACKGROUND OF THE INVENTION

German utility model registration 7,519,322 discloses the determination of the ignition time point based on the position of a throttle element in the intake channel. For this purpose, a pneumatic device is provided which detects the pressure forward and rearward of the throttle element. A device of this kind is constructively complex. The pressure element utilized requires a comparatively large amount of space which is not always available especially in portable handheld work apparatus.

SUMMARY OF THE INVENTION

It is an object of the invention to provide an internal combustion engine which permits a control of the ignition time point with simple means. Furthermore, a method for operating the internal combustion engine is presented.

The internal combustion engine of the invention is for a portable handheld work apparatus. The engine includes: a crankcase; a crankshaft rotatably journalled in the crankcase; a cylinder connected to the crankcase; a piston displaceably mounted in the cylinder for driving the crankshaft; the piston delimiting a combustion chamber wherein an air/fuel mixture is compressed; an ignition device for igniting the air/fuel mixture at an ignition time point; the engine being operable in a first operating state in accordance with a first characteristic line and in a second operating state in accordance with a second characteristic line; the ignition time point being determined based on either one of the characteristic lines; and, the ignition device including switching means for switching between the first characteristic line and the second characteristic line in dependence upon a characteristic variable of the engine.

The control of the ignition time point takes place based on at least two characteristic lines. Accordingly, there is no analog control of the ignition time point in dependence upon an input quantity such as the position of a throttle element. The switchover between the characteristic lines takes place in dependence upon an engine characteristic variable. No absolute value need be determined for the engine characteristic variable; instead, the switchover between the characteristic lines can take place when a relative threshold value is exceeded or there is a drop below this threshold value. The switching element can therefore be simply configured. A first characteristic line is advantageously assigned to the acceleration and a second characteristic line is assigned to the reduction of the rpm because different ignition time points are advantageous in these two operating states.

The engine operating variable is advantageously a pressure. The pressure of the engine can be determined in a simple manner with small pressure sensors. The switching element of the ignition device is especially a pressure-sensitive element which switches the ignition device between the first and second characteristic lines. In this way, the switching element can be integrated directly onto the ignition device. An additional control is not needed. Only a pressure line need be provided with which the pressure-sensitive element is charged. However, it can be advantageous that the ignition device has a control which is connected to the switching element. The switching element is especially a pressure switch. A switch of this kind can be simply constructed and has a small structural volume. The switching element switches in dependence upon a mean pressure.

The switching element is charged with the pressure in the crankcase. For a closed throttle element in the intake channel, the pressure in the crankcase fluctuates about a value less than zero. Accordingly, a mean underpressure is present. The pressure in the crankcase increases abruptly when the throttle flap is opened and fluctuates about a value of approximately zero for an open throttle flap. A corresponding drop of the mean pressure from approximately zero to an underpressure results when the throttle flap is closed.

The change of the mean pressure in the crankcase thereby supplies a value as to whether the engine accelerates or whether the engine rpm reduces. The engine has an intake channel through which an air/fuel mixture is inducted to the engine. It can be practical that the switching element is charged with the pressure in the intake channel. A corresponding fluctuation of a mean pressure also results in the intake channel when opening or closing the throttle element. It is purposeful that the engine has a valve which controls an inlet for the air/fuel mixture into the combustion chamber. The valve is mounted in a valve housing and the switching element is charged with the pressure in the valve housing. The valve housing is advantageously connected via a shaft or channel to the crankcase. The switching element is charged with the pressure in the shaft.

Fluctuating pressures also develop in the valve housing and in the shaft whose mean value changes abruptly when opening or closing the throttle element in the intake channel. In this way, the pressures in the shaft or in the valve housing can be used to switch over between the first and second characteristic lines. Advantageously, the ignition time point is determined in at least a further operating state in accordance with a third characteristic line. The switching element switches over between the characteristic lines. The ignition time point can be well matched to the operating state in that additional characteristic lines for further operating states are provided. Operating states for which individual characteristic lines are provided can, for example, be intense accelerations, low accelerations and large and small reductions of the rpm.

A method for operating an internal combustion engine is especially for an engine in a portable handheld work apparatus and provides that the ignition time point is determined based on an ignition characteristic line. The work apparatus can be a motor-driven chain saw, cutoff machine or the like. The engine has a cylinder in which a piston is journalled. The piston drives a crankshaft rotatably journalled in a crankcase and the piston delimits a combustion chamber wherein an air/fuel mixture is compressed and is ignited by an ignition device. Two different ignition characteristic lines are provided and an engine characteristic variable is determined during operation of the engine. A switchover between the ignition characteristic lines takes place for a pregiven change of the characteristic variable. In this way, the engine can be switched over in a simple manner between an ignition characteristic line for the accelerations as well as an ignition characteristic line for running down the engine. The determination of the engine characteristic variable can take place in a simple manner. Relative values of the characteristic variable are needed so that no precise determination of absolute values need take place; instead, only a determination of the change of the characteristic variable takes place.

The engine characteristic variable is especially a mean pressure. Advantageously, the selection of the ignition characteristic lines takes place in dependence upon the mean pressure in the crankcase. Because of the significant increase or drop of the mean pressure in the crankcase when opening or closing the throttle element, the mean pressure in the crankcase can be well used for switching over between the two ignition characteristic lines. It can, however, be practical that the determination of the mean pressure takes place in the intake channel, in the valve housing or in the shaft which connects the crankcase to the valve housing. Here too, fluctuations of the mean pressure take place in dependence upon the operating state of the engine.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
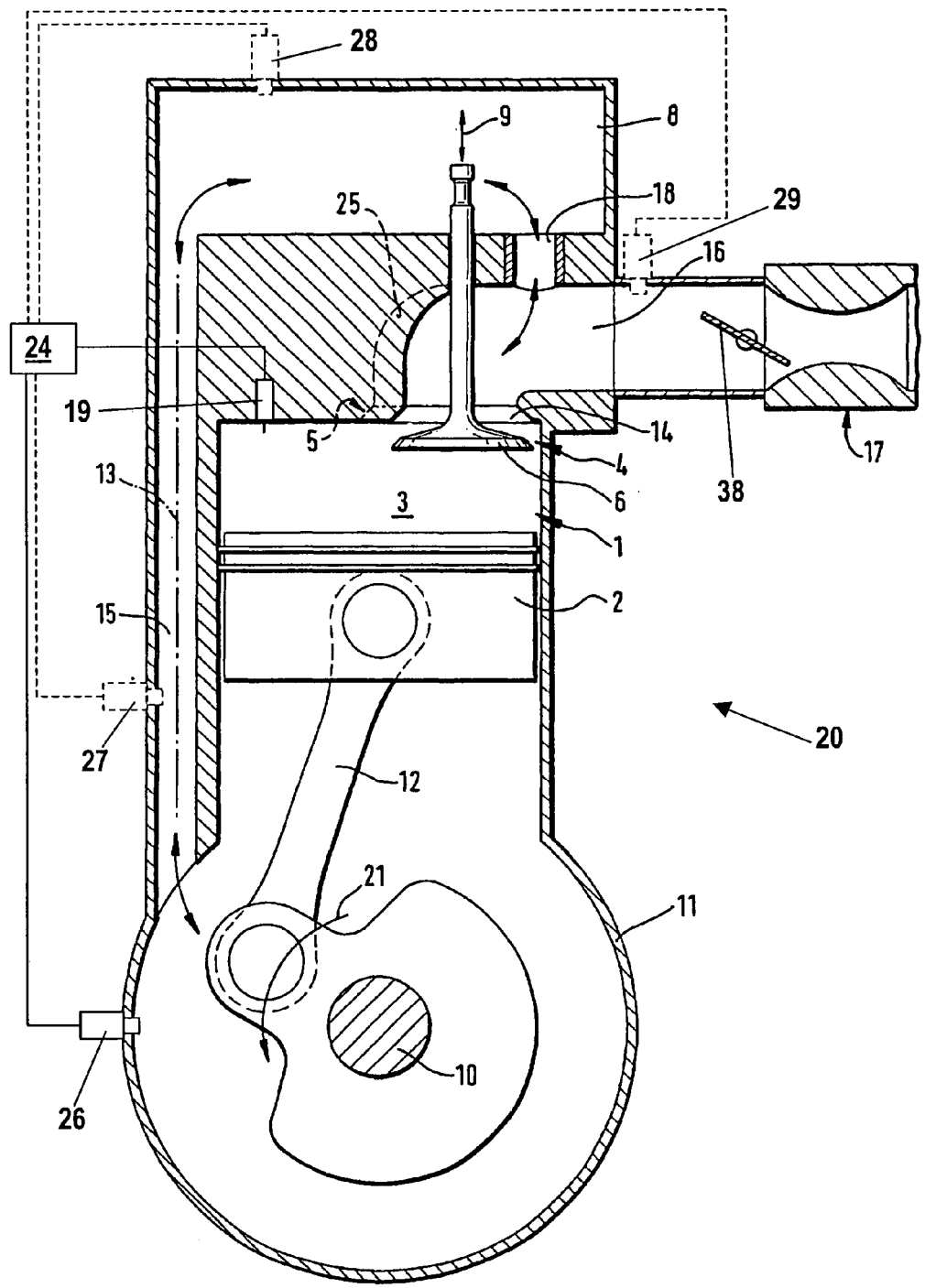
FIG. 1 is a schematic section view of an embodiment of an internal combustion engine according to the invention.

FIG. 1 shows an internal combustion engine 20 which is configured as a mixture-lubricated four-stroke engine. The engine 20 includes a cylinder 1 in which a piston 2 is mounted for reciprocating movement. The piston 2 drives a crankshaft 10 via a connecting rod 12 to rotate in a rotational direction 21. The crankshaft 10 is rotatably journalled in a crankcase 11. The piston 2 delimits a combustion chamber 3. The intake channel 16 opens into the combustion chamber 3 via an inlet 14. The inlet 14 is opened or closed by the valve plate 6 of the valve 4. The valve 4 moves up and down in the direction of arrow 9. A mixture preparation device 17 is mounted in the intake channel 16 and can, for example, be a carburetor which includes a throttle flap 38. In lieu of the throttle flap 38, another throttle element can be provided. The throttle flap 38 substantially closes the intake channel 16 during idle of the engine.

In FIG. 1, the throttle flap 38 is shown in the half-throttle position. In full-throttle position, the throttle flap 38 lies approximately parallel to the intake channel 16 so that it influences the flow in the intake channel 16 only slightly.

The valve 4 is configured as an inlet valve and is mounted in a valve housing 8 which, in turn, is mounted above the intake channel 16 in the embodiment of FIG. 1. The valve housing 8 is connected to the crankcase 11 via a shaft 15. The engine 20 includes a connecting channel 18 which connects the intake channel 16 to the valve housing 8. In this way, a fluid connection is present between the intake channel 16 and the crankcase 11 via the connecting channel 18, the valve housing 8 and the shaft 15. Via this fluid connection, an air/fuel mixture can be inducted into the crankcase 11 during the upward stroke of the piston 2, that is, when the inlet 14 is closed by the valve plate 6 and the air/fuel mixture is compressed in the combustion chamber 3. The mixture inducted into the crankcase functions to lubricate the crankshaft 10.

An ignition device 19 is mounted on the combustion chamber 3 and includes a spark plug or the like for igniting the mixture in the combustion chamber 3. The ignition device 19 is controlled by a control unit 24. The control unit 24 is connected to a pressure switch 26 which measures the mean pressure in the crankcase 11. In lieu of the pressure switch 26, a pressure switch 27 can be provided, which is charged with the pressure in the shaft 15, or a pressure switch 28 can be provided, which is charged with the pressure in the valve housing 8, or a pressure switch 29 can be provided in the intake channel 16. The control unit 24 can be configured simply because it only functions to determine the ignition time point based on characteristic lines.

Figure 2:
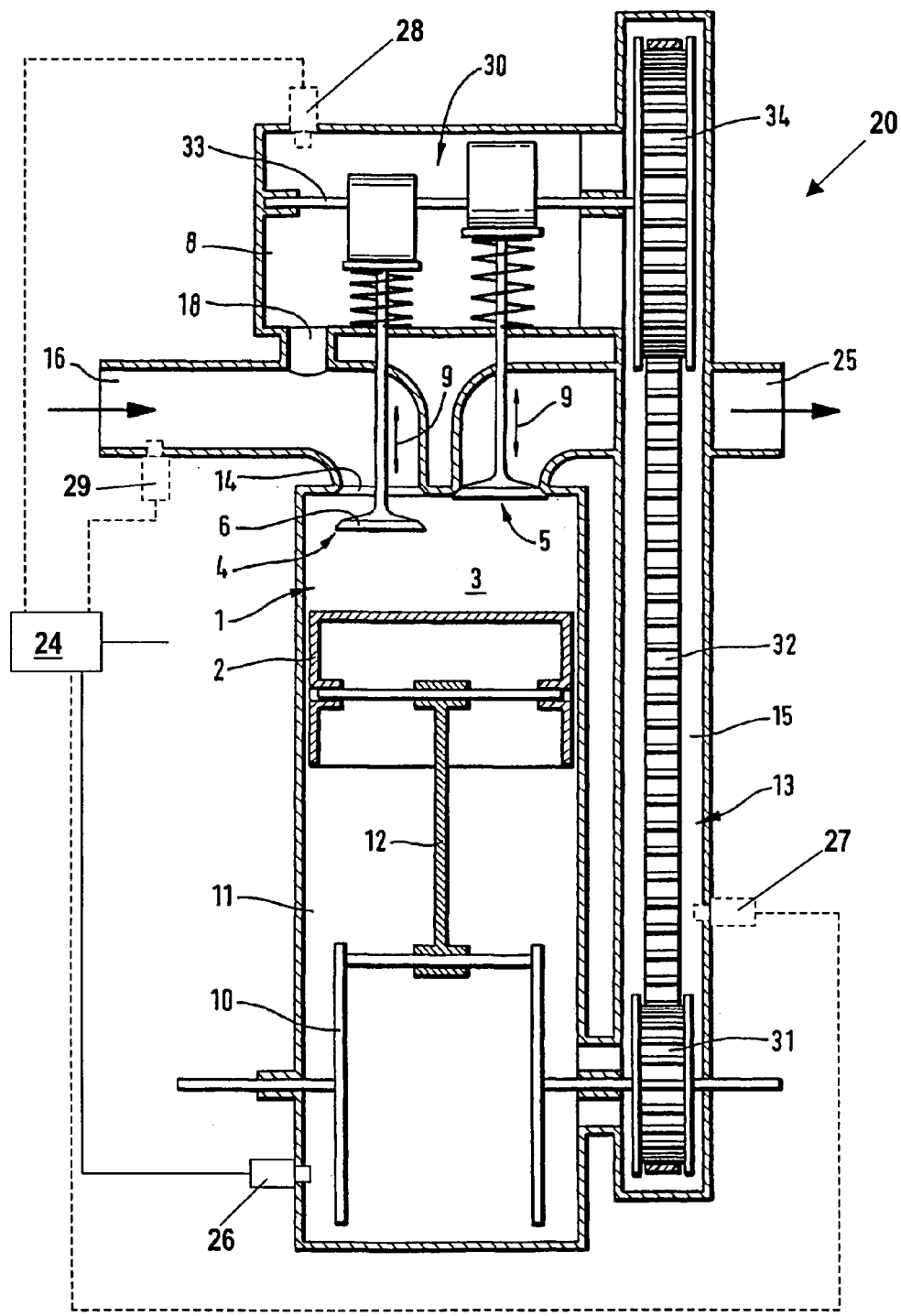
FIG. 2 is a side elevation view, partially in section, of the engine of FIG. 1.

As FIG. 2 shows, an outlet channel 25 leads from the combustion chamber 3 which is opened or closed by an outlet valve 5. The two valves 4 and 5 are actuated by a cam drive 30. The cams, which act on the valves 4 and 5, are held on the camshaft 33 so as to rotate therewith. The camshaft 33 is actuated by a belt pulley 34 which is connected via a belt 32 to a drive wheel 31 so as to rotate therewith. The drive wheel 31 is connected to the crankshaft 10 so that it rotates therewith and so that the movement of the valves 4 and 5 is matched to the rotation of the crankshaft 10. The drive wheel 31, the belt 32 and the belt pulley 34 define the valve drive 13 which is mounted in the shaft 15. In lieu of the valve drive 13, valve rods can be mounted in the shaft 15 which are actuated by cams which, in turn, are actuated by the crankshaft 10. The valve rods can operate on rocker arms mounted in the valve housing and these rocker arms actuate the valves. Other devices for actuating the valves can be provided.

During operation of the engine 20, an air/fuel mixture is inducted into the combustion chamber 3 during a downward stroke of the piston 2 while the inlet valve 4 is open. In the subsequent upward stroke of the piston 2, the mixture is compressed in the combustion chamber 3 and is ignited by the ignition device 19 which is not shown in FIG. 2. In the next upward stroke of the piston 2, the outlet valve 5 is opened so that the exhaust gases can escape from the combustion chamber 3. In the next downward stroke of the piston 2, the inlet valve 4 is again opened and the air/fuel mixture for the next combustion operation is inducted into the combustion chamber 3.

The ignition of the air/fuel mixture in the combustion chamber 3 takes place in the region of top dead center of the piston 2. However, the ignition time point must be varied to obtain an optimal combustion in dependence upon the operating state of the engine 20. The ignition time point is changed in dependence upon the rpm of the engine as well as in dependence upon the operating state, that is, in dependence upon whether the engine 20 is accelerating or the engine is decelerating. During acceleration of the engine, the throttle flap 38, which is shown in FIG. 1, is rotated from the substantially closed position to the completely open position; whereas, when decelerating, the throttle flap is brought from the open position into the substantially closed position.

Figure 3:
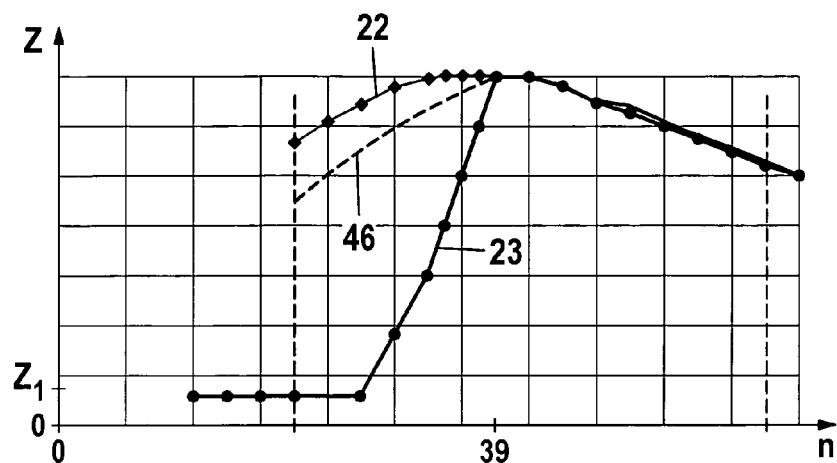
FIG. 3 is a diagram showing two different ignition characteristic lines represented by the ignition time point plotted as a function of engine rpm (n)

FIG. 3 shows a diagram with ignition characteristic lines. In FIG. 3, the ignition time points Z are plotted as a function of the rpm (n). The first characteristic line 22 defines the acceleration characteristic line. When accelerating the engine 20, the ignition time point Z is determined based on the characteristic line 22. When running down the engine 20, that is, when the engine rpm (n) is becoming less and less, the ignition characteristic lines 22 and 23 are virtually coincident up to an rpm 39. With a further reducing rpm, the ignition time point Z shifts in accordance with the ignition characteristic line 23 very greatly to later ignition time points up to a latest ignition time point $Z_1$ which lies just ahead of top dead center of piston 2 (identified by "0" in FIG. 3). A third characteristic line 46 is shown in FIG. 3 as a broken line. At rpms below the rpm 39, the ignition characteristic line 46 runs between the characteristic lines 22 and 23. In a third operating state, the switching element can be switched over from the characteristic line 22 to the characteristic line 46 or from the characteristic line 23 to the characteristic line 46 or in the opposite direction in each case. In this way, the ignition time point Z can be well adapted to the operating state. Additional ignition characteristic lines can be provided to which the switching element can be switched.

The switchover between the ignition characteristic lines 22 and 23 takes place based on an engine characteristic variable. The engine characteristic variable is especially a mean pressure. However, other characteristic variables of the engine 20 can also be applied which change abruptly when opening or closing the throttle flap 38.

Figure 4:
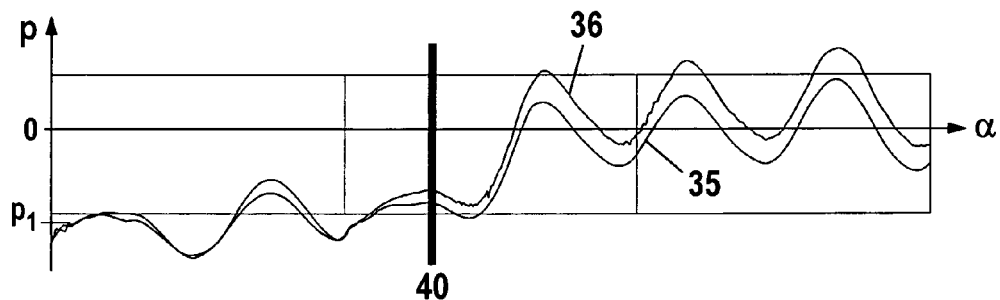
FIG. 4 is a trace of the pressure in the crankcase and in the valve housing as a function of the crankshaft angle (α) when the throttle element is opened.

In FIG. 4, the pressure (p) is plotted as a function of the crankshaft angle (α). In FIG. 4, and by way of example, the crankcase pressure 35 and the valve housing pressure 36 are plotted. Corresponding fluctuations of the pressure, however, result in the intake channel 16 and in the shaft 15. At first, the pressure (p) fluctuates about a mean pressure $p_1$ which is an underpressure. At time point 40, the throttle flap 38 is opened and this means that the engine 20 begins to accelerate.

As shown in FIG. 4, the crankcase pressure 35 immediately increases and fluctuates about a value of approximately zero. Also, the valve housing pressure 36 increases correspondingly and fluctuates about a value which is somewhat greater than zero. The mean pressure in the crankcase 11 can be measured via the pressure switch 26. When the mean pressure increases abruptly, the control unit 24 switches the ignition device 19 to the acceleration characteristic line 22. The ignition time point Z is shifted toward earlier time points Z in correspondence to characteristic line 22.

Figure 5:
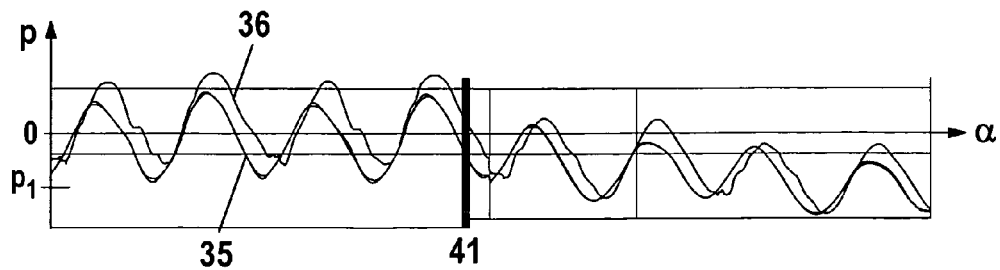
FIG. 5 is a graph showing the trace of the pressure in the crankcase as a function of the crankshaft angle (α) when the throttle element is closed; and, FIG. 6 is a schematic section view through an engine according to another embodiment of the invention.

In FIG. 5, the engine 20 first runs at full load operation. The crankshaft pressure 35 fluctuates about a mean pressure of approximately zero while the mean valve housing pressure lies somewhat higher than zero. At time point 41, the throttle flap 38 is closed. As shown in FIG. 5, the crankcase pressure 35 as well as the valve housing pressure 36 drop abruptly and fluctuate about a mean pressure p1 which is less than zero thereby defining an underpressure. Because of the abrupt change of the pressure (p), the control unit 24 switches from the acceleration characteristic line 22 to the ignition characteristic line 23 and determines the ignition time point Z based on characteristic line 23. In lieu of the crankcase pressure 35 and the valve housing pressure 36, the pressure in the shaft 15 can be used via the pressure switch 27 or the pressure in the intake channel 16 can be used as input quantity for the control unit 24 via the pressure switch 29.

Figure 6:
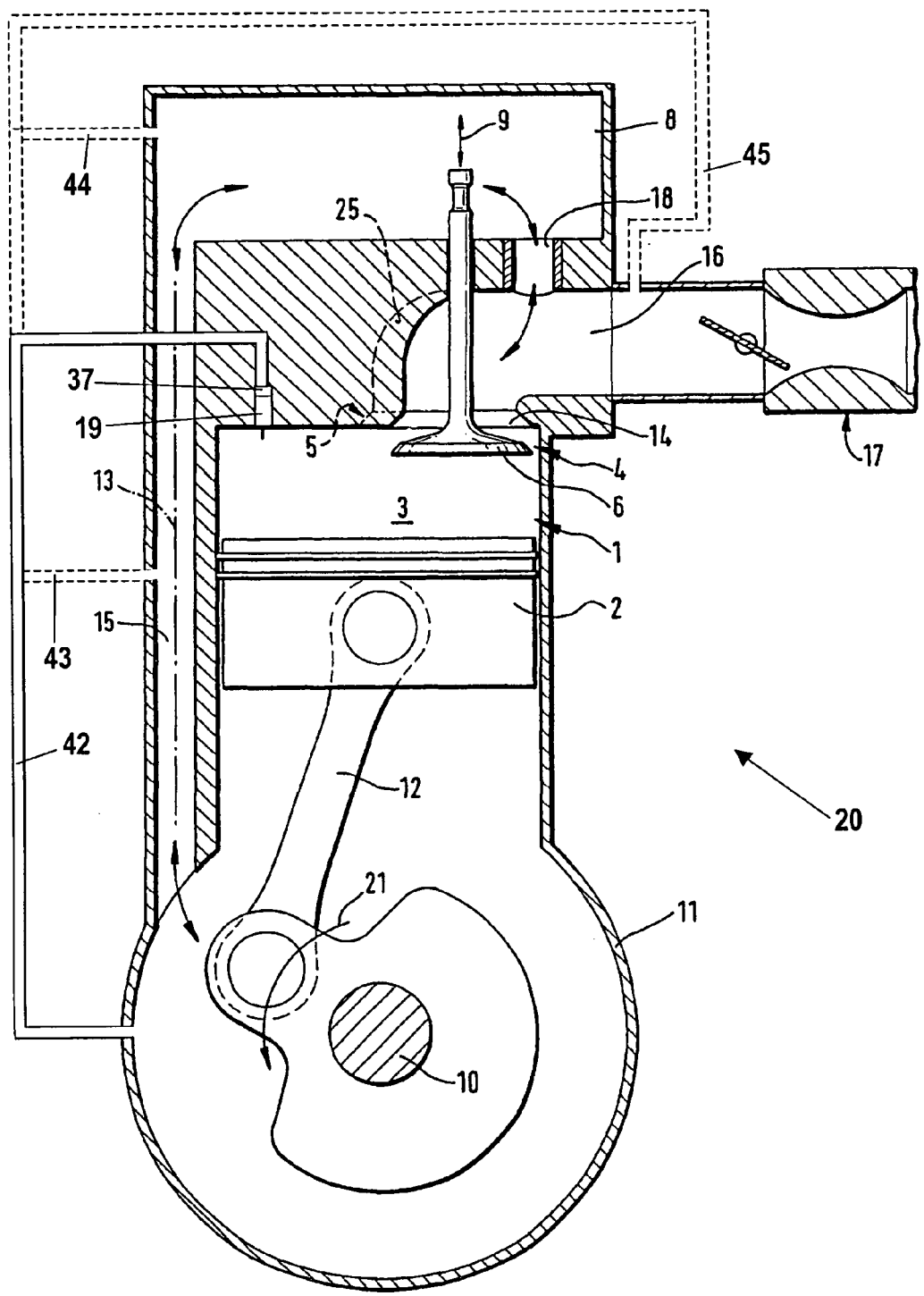

In FIG. 6, a further embodiment of the engine 20 is shown. Here, the same reference numerals identify the same components as in FIGS. 1 and 2. The ignition device 19 of the engine 20 shown in FIG. 6 has a pressure-sensitive element 37 which is connected via a pressure line 42 to the crankcase 11. An abrupt change of the mean pressure in the crankcase 11 leads to the situation that the pressure-sensitive element 37 switches the ignition device 19 over between the characteristic lines 22 and 23. For an increase of the mean pressure in the crankcase 11, the pressure-sensitive element 37 switches the ignition device 19 accordingly from the characteristic line 23 to the acceleration characteristic line 22; whereas, for an abrupt drop of the crankcase pressure 35, a switchover takes place from the acceleration characteristic line 22 to the ignition characteristic line 23. In lieu of the pressure line 42, a pressure line 43 can also be provided which is shown by a broken line in FIG. 6 and which opens into the shaft 15. Likewise, a pressure line 44, which opens into the valve housing 8, or a pressure line 45, which opens into the intake channel 16, can be provided.

In the embodiment of FIG. 6. only a pressure line as well as an ignition device 19 having a pressure-sensitive element 37 are needed for switching over the characteristic line. An engine 20 of this kind can accordingly be simply configured and only needs few additional components as well as only little additional structural space. A drive of this kind is advantageous especially in portable handheld work apparatus because complex pressure devices cannot be utilized here because of the limited space available. Likewise, a complex control can be utilized only with difficulty because the current supply of a control unit of this kind cannot easily be ensured.

It is understood that the foregoing description is that of the preferred embodiments of the invention and that various changes and modifications may be made thereto without departing from the spirit and scope of the invention as defined in the appended claims.

What is claimed is:

1. An internal combustion engine comprising:

a crankcase;

a crankshaft rotatably journalled in said crankcase;

a cylinder connected to said crankcase;

a piston displaceably mounted in said cylinder for driving said crankshaft;

said piston delimiting a combustion chamber wherein an air/fuel mixture is compressed;

an ignition device for igniting said air/fuel mixture at an ignition time point (Z);

said engine operating at an engine rpm (n) and being operable in a first operating state in accordance with a first characteristic line and in a second operating state in accordance with a second characteristic line;

said ignition time point (Z) being determined based on either one of said characteristic lines with said ignition time point (Z) being given by said characteristic lines in dependence upon said engine rpm (n); and, said ignition device including switching means for switching between said first characteristic line and said second characteristic line in dependence upon a characteristic variable of said engine.

2. The internal combustion engine of claim 1, wherein said characteristic variable of said engine is a pressure (p).

3. The internal combustion engine of claim 2, said switching means being a pressure sensitive element which switches said ignition device between said first and second characteristic lines.

4. The internal combustion engine of claim 3, wherein said engine includes an intake channel through which an air/fuel mixture is inducted to said engine.

5. The internal combustion engine of claim 4, wherein said switching element is charged with the pressure in said intake channel.

6. The internal combustion engine of claim 3, wherein said engine further includes a valve for controlling an inlet for the entry of said air/fuel mixture into said combustion chamber.

7. The internal combustion engine of claim 6, wherein said engine further includes a valve housing and said valve is mounted in said valve housing and said switching element is charged with the pressure in said valve housing.

8. The internal combustion engine of claim 3, wherein said engine further includes a valve housing and a shaft connecting said valve housing to said crankcase.

9. The internal combustion engine of claim 8, wherein said switching element is charged with the pressure in said shaft.

10. The internal combustion engine of claim 2, said ignition device including a control unit connected to said switching means.

11. The internal combustion engine of claim 1, wherein said switching means is a pressure switch.

12. The internal combustion engine of claim 11, wherein said pressure switch switches in dependence upon a mean pressure.

13. The internal combustion engine of claim 12, wherein said pressure switch is charged with pressure in said crankcase.

14. The internal combustion engine of claim 1. wherein said engine is operable in a third operating state in accordance with a third characteristic line; said ignition time point (Z) is determinable in accordance with said third characteristic line and said switching means switches between said characteristic lines.

15. The internal combustion engine of claim 1, wherein said engine is for a portable handheld work apparatus including a motor-driven chain saw or a cutoff machine.

16. The internal combustion engine of claim 1, wherein said switching means switches over between said first characteristic line and said second characteristic line when a relative threshold value of said characteristic variable is exceeded or when there is a drop therebelow.

17. The internal combustion engine of claim 1, wherein said first characteristic line is assigned to an acceleration of said engine rpm (n) and said second characteristic line is assigned to a reduction of said engine rpm (n).

18. A method of operating an internal combustion engine operating at an engine rpm (n) and which includes a crankcase; a crankshaft rotatably journalled in said crankcase; a cylinder connected to said crankcase; a piston displaceably mounted in said cylinder for driving said crankshaft; said piston delimiting a combustion chamber wherein an air/fuel mixture is compressed; and, an ignition device for igniting said air/fuel mixture at an ignition time point (Z); the method comprising the steps of:

providing a first ignition characteristic line and a second ignition characteristic line;

determining said ignition time point (Z) based on either one of said ignition characteristic lines with said ignition time point (Z) being given by said characteristic lines in dependence upon said engine rpm (n);

detecting a characteristic variable of said engine during the operation thereof; and, switching between said ignition characteristic lines when there is a predetermined change in said characteristic variable.

19. The method of claim 18, wherein said characteristic variable of said engine is a mean pressure.

20. The method of claim 19, wherein the switchover of said ignition characteristic lines takes place in dependence upon the mean pressure in said crankcase.

21. The method of claim 19, wherein said engine includes an intake channel through which an air/fuel mixture is inducted to said engine; and, wherein the method comprises the further step of switching over between said ignition characteristic lines in dependence upon the mean pressure in said intake channel.

22. The method of claim 19, wherein said engine further includes a valve for controlling an inlet for the entry of said air/fuel mixture into said combustion chamber; a valve housing; and, said valve is mounted in said valve housing.

23. The method of claim 22, wherein the switchover between said ignition characteristic lines takes place in dependence upon the mean pressure in said valve housing.

24. The method of claim 19, wherein said engine includes a valve housing; and, a shaft connecting said valve housing to said crankcase; and, the method comprises the further step of switching over between said ignition characteristic lines in dependence upon the mean pressure in said shaft.

25. The method of claim 18, wherein said engine is for a portable handheld work apparatus including a motor-driven chain saw or a cutoff machine.

26. The method of claim 18, wherein a switchover occurs between said characteristic lines when said characteristic variable exceeds a pregiven threshold value or drops below said threshold value.

27. The method of claim 18, wherein said first characteristic line is assigned to an acceleration of said engine rpm (n) and said second characteristic line is assigned to a reduction of said engine rpm (n).

\* \* \* \* \*